United States Patent [19]

Kiuchi et al.

[11] 4,016,391
[45] Apr. 5, 1977

[54] INDUCTION HEATING APPARATUS WITH MEANS FOR IMPROVING THE DV/DT CAPABILITY OF A SILICON-CONTROLLED RECTIFIER USED THEREIN

[75] Inventors: Mitsuyuki Kiuchi; Takumi Mizukawa, both of Kadoma, Japan

[73] Assignee: Matsushita Electric Industrial Co., Ltd., Japan

[22] Filed: June 13, 1975

[21] Appl. No.: 586,621

[30] Foreign Application Priority Data

June 18, 1974 Japan .............................. 49-70016
June 19, 1974 Japan .............................. 49-70626
July 10, 1974 Japan .............................. 49-79652

[52] U.S. Cl. .......................... 219/10.49; 219/10.77; 307/252 C; 321/14
[51] Int. Cl.² .......................................... H05B 5/04
[58] Field of Search ..................... 219/10.77, 10.75; 307/240, 247 R, 252 C; 321/14, 45 C; 323/22 SC

[56] References Cited

UNITED STATES PATENTS

| | | | |
|---|---|---|---|
| 3,206,696 | 9/1965 | Wright | 307/252 C |
| 3,308,800 | 3/1967 | Motto et al. | 307/252 C |
| 3,553,567 | 1/1971 | Pesce et al. | 321/14 |
| 3,622,806 | 11/1971 | Williams | 307/252 C |
| 3,821,509 | 6/1974 | Amagami et al. | 219/10.77 |
| 3,821,565 | 6/1974 | Horinaga | 307/252 C |
| 3,855,518 | 12/1974 | Genuit | 307/252 C |

*Primary Examiner* — Bruce A. Reynolds
*Attorney, Agent, or Firm* — Robert E. Burns; Emmanuel J. Lobato; Bruce L. Adams

[57] ABSTRACT

A gate controlled thyristor (SCR) used for switching at high frequency for induction heating is supplied with a negative bias during an interval ranging from the point where the forward current reaches to zero to the time of reapplication of a subsequent gating signal. This provides high dv/dt (the rate of rise of anode voltage) capability and small turn off time to the device.

4 Claims, 10 Drawing Figures

INDUCTION HEATING APPARATUS WITH MEANS FOR IMPROVING THE DV/DT CAPABILITY OF A SILICON-CONTROLLED RECTIFIER USED THEREIN

BACKGROUND OF THE INVENTION

The present invention relates to static power converters for induction heating, and more specifically to a gate control circuit for repetitiously gating, a silicon-controlled rectifier incorporated in an inverter, at ultrasonic frequency.

When a forward voltage is applied rapidly to a silicon-controlled rectifier, switching can occur by a mechanism commonly called dv/dt triggering. Basically, this type of switching occurs as the depletion region of its center pn junction adjusts to accommodate the increasing voltage. As the depletion width of the center junction increases, holes and electrons are removed from the adjacent regions of the junction. For a slow increase in voltage, the resulting flow of holes and electrons does not constitute a significant current. If dv/dt is large, however, the rate of charge removal from each side of the center junction can cause the current to increase significantly. If the silicon controlled rectifier has a small dv/dt rating, the device will be turned on by the reapplied forward voltage immediately after the forward commutating current falls to zero before the device is normally turned on by a positive gating signal.

To turn off the silicon-controlled rectifier in a minimum time if it is necessary to apply a reverse voltage. When this reverse voltage is applied, the holes and electrons in the vicinity of the two end junctions will diffuse to these junctions and result in a reverse current in the external circuit. After the holes and electrons in the vicinity of the two end junctions have been removed, the reverse current will cease and the end junctions will assume a blocking state. The reverse voltage across the device will then increase to a value determined by the external circuit. Recovery of the SCR is not complete, however, since a high concentration of holes and electrons would still exist in the vicinity of the center junction. This concentration decreases by the process of recombination.

When an SCR is used as a switching element in high frequency applications such as inverters, the dv/dt capability and its turn off time become an important characteristic. Turn off time is defined as the time interval required for the device to regain its forward blocking state after forward conduction.

In order to prevent the silicon-controlled rectifier from becoming conductive immediately after the forward conduction due to the rapid rise in the reapplied forward anode voltage, a prior art induction heating apparatus, such as disclosed in U.S. Pat. Nos. 3,710,062 and 3,821,509, employs an RC snubber circuit to prevent the premature switching action. However, the use of the RC snubber circuit entails loss of usable energy for induction heating.

SUMMARY OF THE INVENTION

Therefore, an object of the invention is to provide an induction heating apparatus which eliminates the loss of electrical energy for induction heating.

Another object of the invention is to assure reliable switching action of a silicon-controlled rectifier used for generating high frequency power current.

A further object of the invention is to provide a high dv/dt rating of the silicon-controlled rectifier and a small value of turn off time of the device, with the resultant increase in breakover voltage.

A further object is to provide a gate control circuit which applies a negative biasing potential while the device is nonconducting.

Still another object of the invention is to provide a gate control circuit which detects the cessation of the forward commutating current and thereupon initiates application of a negative potential to the control gate with respect to cathode.

Briefly described, in one aspect of the invention, a gate control circuit comprises means for setting up a first predetermined time interval running from the time when a gating signal is applied to the control gate of the silicon-controlled rectifier resulting in the flow of a forward commutating current to the cessation of the forward commutating current, means for setting up a second predetermined time interval which runs from the cessation of the forward commutating current to the time of reapplication of the gating signal, and means for applying a negative potential to the control gate during the second predetermined interval. In another aspect of the invention, the gate control circuit is provided with means for detecting the cessation of the forward commutating current in order to determine the time of application of the negative bias to prevent overcurrent if the negative bias is applied while the device is conducting due to the variation of commutating interval in correspondence with the variation of a pan load.

The application of a negative potential to the control gate (the center P region of the device) serves to sweep the excess carriers from the center junction and reduce the concentration of the excess carriers. After the hole and electron concentration at the center junction has decreased to a low value, the center junction will regain its blocking state and a forward voltage may be applied to the device without causing it to turn on. This provides high dv/dt capability, small turn off time and high breakover voltage and an eliminate undesirable commutation loss due to the use of a dv/dt suppression snubber circuit.

BRIEF DESCRIPTION OF THE DRAWINGS

The invention will be described by way of example in the following description taken in conjunction with the accompanying drawings, in which.

DESCRIPTION OF THE PREFERRED EMBODIMENTS

Figure 1:
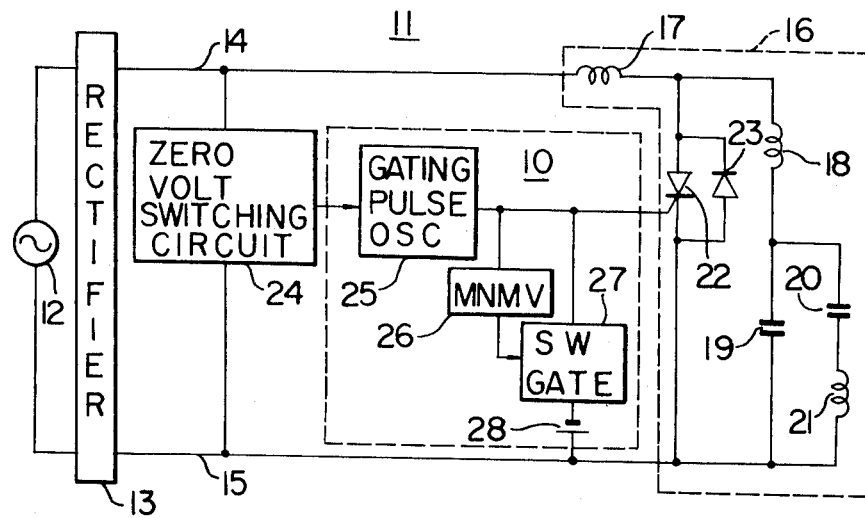
FIG. 1 is a circuit diagram showing a first embodiment of the present invention.

Referring now to FIG. 1 there is shown a gate control circuit 10 of the invention incorporated in an induction heating apparatus 11 constructed in a manner generally similar to that disclosed in U.S. Pat. No. 3,821,509 issued to the same assignee. The circuit of FIG. 1 is energized from a conventional commercial or residential alternating current power supply source 12 which is connected to a full wave rectifier 13 of conventional circuitry which full wave rectifies the alternating current supply potential and supplies its output to a pair of power supply buses or terminals 14 and 15. The output from the full wave rectifier 13 is unfiltered, and hence the potential appearing across the terminals 14 and 15 is unidirectional and in the form of a series of halfwave sinusoidal-shaped rectified high voltage pulses that drop substantially to zero voltage level intermediate successive halfwave pulses and have a frequency double that of the alternating current supply.

The full wave rectifier 13 couples the excitation potential to a static power converter shown in a dashed-line rectangle 16 which is comprised by a filter inductor 17, a commutating inductor 18, a commutating capacitor 19, a filter capacitor 20, an induction heating coil 21 and a bidirectional conducting, gate controlled, semiconductor thyristor switching device formed by a power rated silicon-controlled rectifier (SCR) 22 and a reversely poled parallel connected, feedback diode 23. The SCR 22 and feedback diode 23 are connected across the junction between the inductors 17 and 18 and the bus line 15.

In order to insure that the silicon-controlled rectifier 22 is excited only at or near the beginning of the sinusoidal pulses, a zero voltage sensing and switching circuit 24 is coupled to the full wave rectifier 13. The zero voltage switching circuit 24 detects the presence of a zero voltage point between successive halfwave pulses and delivers an output to a gating pulse oscillator 25 of the gate control circuit 10. In this manner, surge charging of the commutating components with initial high voltage, which would result in undesirable consequences, such as misfiring of the switching SCR 22 due to the lack of a sufficient gating signal at a desired turn-on point, is avoided. The gating pulse oscillator 25 supplies a train of gating pulses at the rate of ultrasonic frequency to the gate electrode of SCR 22. Therefore, it is seen that SCR 22 will be in the conductive state during each positive half cycle of the ultrasonic frequency under the control of the gating pulses and the blocking state during the negative half cycle during which energy stored in the commutating capacitor 19 will be discharged through the feedback diode 23.

Figure 2:
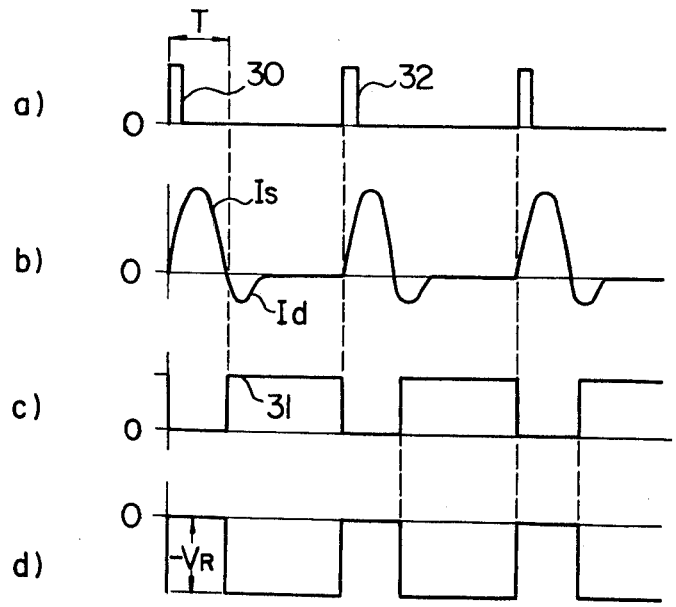
FIG. 2 is a waveform diagram useful for describing the operation of circuit of FIG. 1.

In accordance with a first embodiment of the invention, the gate control circuit 10 comprises the gating pulse oscillator 25, a monostable multivibrator 26, a switching gate 27 such as transistor and a negative bias source 28. The output pulses from the gating oscillator 25 are applied to the gate electrode of SCR 22, while at the same time applied to the monostable multivibrator 26 which delays the application of a gating pulse to the switching gate 27 by a predetermined time duration. Switching of gate 27 applies a negative potential between the gate electrode and the cathode of SCR 22. The output from the monostable multivibrator 26 is so delayed that the negative bias from source 28 is only applied during the turn off time of SCR 22. As shown in FIG. 2, gating pulse 30 (FIG. 2a) from gating pulse oscillator 25 turns on SCR 22 for a commutating period "T" determined by the circuit parameters of the commutating components of the inverter circuit 16, during which energization current $I_s$ flows through SCR 22 (FIG. 2b). In the successive half cycle, backward current $I_d$ flows through the feedback diode 23, the magnitude of which is determined by the load placed over the induction heating coil 21. The monostable multivibrator 26 may comprise two monostable multivibrators: the pulse duration of the fist one of the multivibrators generates a first pulse of a duration equal to the communicating interval "T" in response to the leading edge of the pulse 30, and the second one of which generates a pulse 31 in response to the trailing edge of the first pulse (FIG. 2c). The gate electrode of SCR 22 is thus held at a negative potential $V_R$ with respect to the cathode from the point where the forward current falls to zero to the application of the subsequent gating pulse 32 as shown in FIG. 2d.

Figure 3:
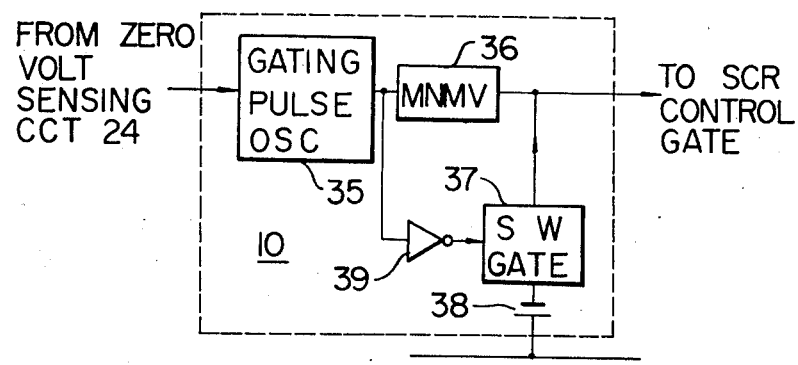
FIG. 3 is a variation of the circuit of FIG. 1.
Figure 4:
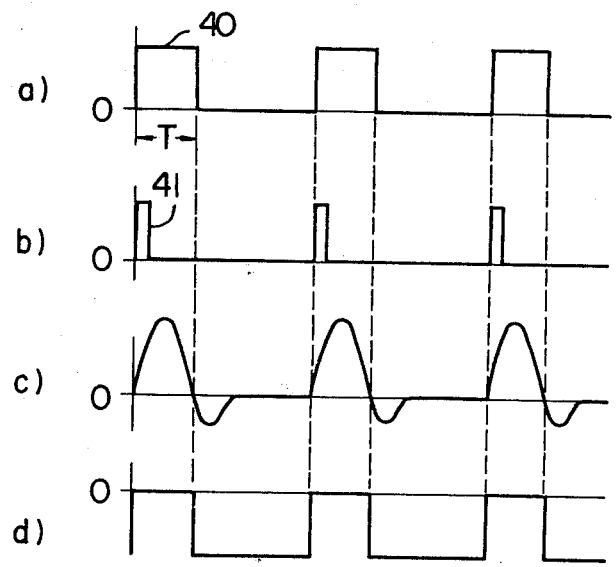
FIG. 4 is a waveform diagram useful for describing the operation of circuit of FIG. 3.

A variation of gate control circuit 10 of FIG. 1 is shown in FIG. 3 in which the gating pulse oscillator 35 is designed to produce a pulse 40 which is at the high level during time duration "T" equal to the turn on time of SCR 22 and remains at the low level during the turn off time of SCR 22. The monostable multivibrator 36 is designed to produce a gating pulse 41 at the rising edge of the input pulse. The gating pulse 41 has a width of narrower than that of the pulse 40, but sufficient to turn on SCR 22. The output pulses from gating pulse oscillator 35 are inverted as shown in FIG. 4d by inverter 30 to open the gate 37 during the turn off time of SCR 22 so that negative bias potential 38 is coupled to the gate electrode of SCR 22.

Figure 5:
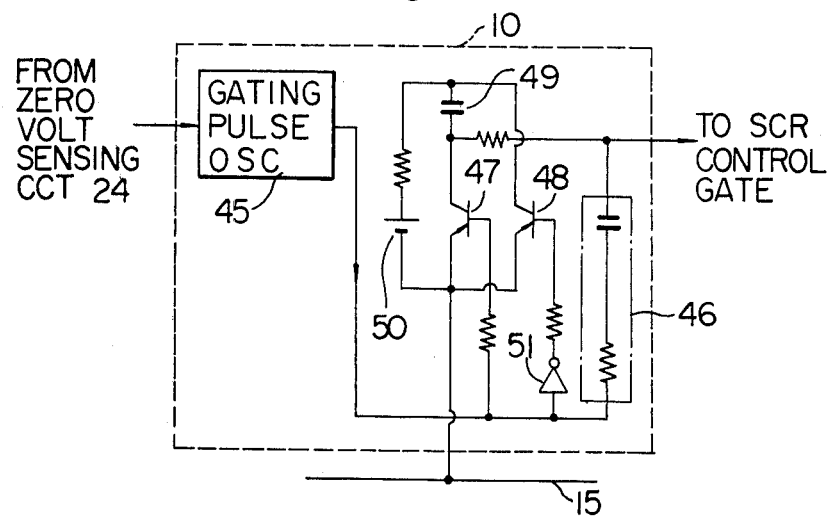
FIG. 5 is another modified form of the circuit of FIG. 1.
Figure 6:
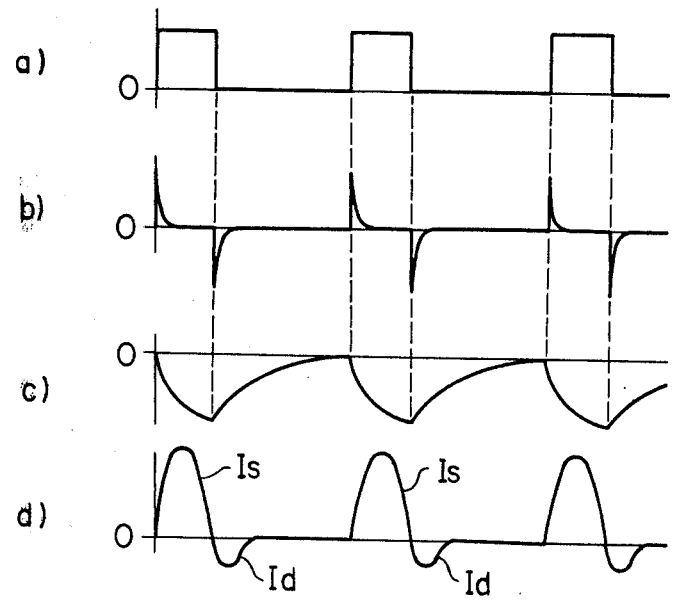
FIG. 6 is a waveform diagram useful for describing the operation of circuit of FIG. 5.

In FIG. 5 there is shown another variation of the gate control circuit in which repetitious charging and discharging operations are provided to turn on the silicon-controlled rectifier 22. The gating pulse oscillator 45 of FIG. 5 is designed to deliver square pulses as shown in FIG. 6a which are differentiated by an RC network 46 as shown in FIG. 6b. The positive pulses of the differentiated signal are used to trigger SCR 22. In the presence of a pulse from the gating pulse oscillator 45, transistor 47 is conductive to allow capacitor 49 to be charged by the current supplied from a DC power source 50, while transistor 48 is in the blocking state by means of an inverter 51. When the output pulse ceases, transistor 47 is switched to the blocking state while transistor 48 assumes conducting state. The turn-on of transistor 48 and the turnoff of transistor 47 allows the voltage developed across the capacitor 49 to be discharged through transistor 48 and this impresses a negative potential to the control gate of SCR 22 with respect to the cathode (see FIG. 6c). Therefore, the control gate SCR 22 is held negative relative to the cathode during its turn off time if the width of the pulse generated by the gating pulse oscillator 45 is selected to be equal to or slightly greater than the commutation interval of the current $I_s$ flowing through the SCR 22 as shown in FIGS. 6a and 6d.

Figure 7:
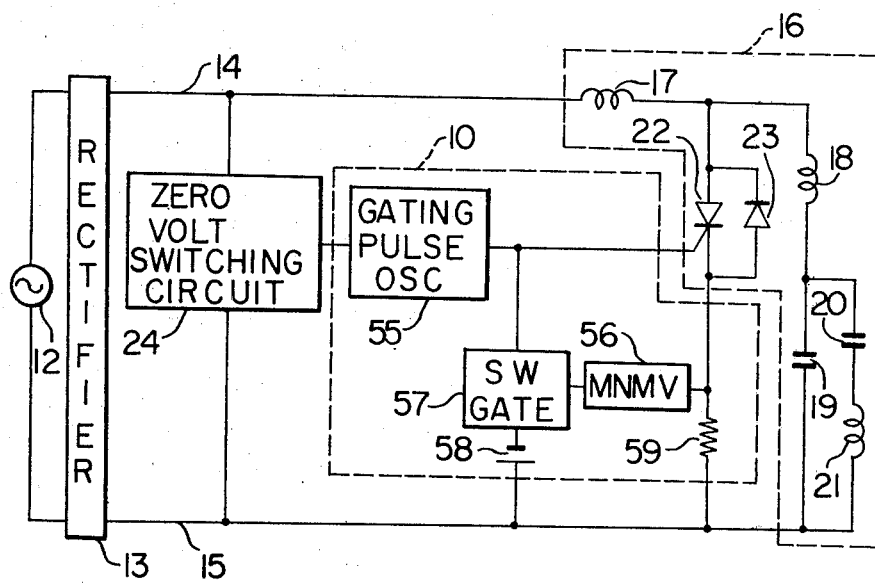
FIG. 7 is a further modified form of the invention.

A further modification of the circuit of FIG. 1 is shown in FIG. 7 in which the gate control circuit 10 comprises a gating pulse generator 55 generating a train of gating pulses upon switching of circuit 24 as referred to above, a switching gate 57, a negative bias source 58, a forward commutating current detecting resistor 59 and a delaying monostable multivibrator 56. The resistor 59 is coupled in the common circuit leg of SCR 22 and diode 23 to develop a signal when the forward commutating current is started upon gating by means of the gating signal from circuit 55. The monostable multivibrator 56 produces a delayed pulse after the elapse of a predetermined interval which is substantially equal to or greater than the commutation interval of SCR 22. Switching gate 57 is enabled by the delayed gating pulse from monostable multivibrator 56 so that the control gate of SCR 22 is held at a negative potential with respect to its cathode from the point in time where the forward commutating current reaches to zero to the time of reapplication of a gating signal from oscillator 55. Therefore, the output pulse from the monostable multivibrator 56 should cease before the occurrence of the subsequent gating pulse from gating oscillator 55.

The foregoing embodiments are particularly useful for inverter applications where the forward commutation interval remains substantially constant. However, in applications where the electromagnetic coupling between the induction heating coil and a pan load placed thereover varies as the result of a change in the size of load, the commutation interval is affected to vary. Therefore, it is advantageous to apply the negative bias only after detection of the cessation of forward commutation current.

Figure 8:
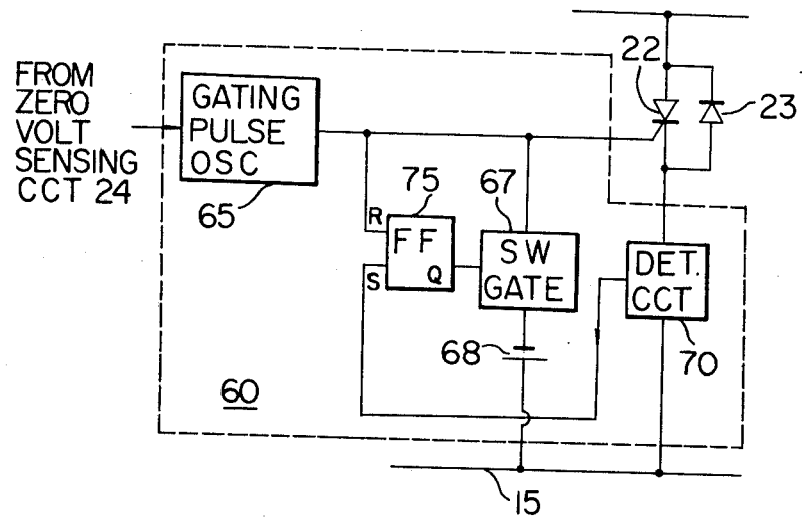
FIG. 8 is a second embodiment of the invention.
Figure 9:
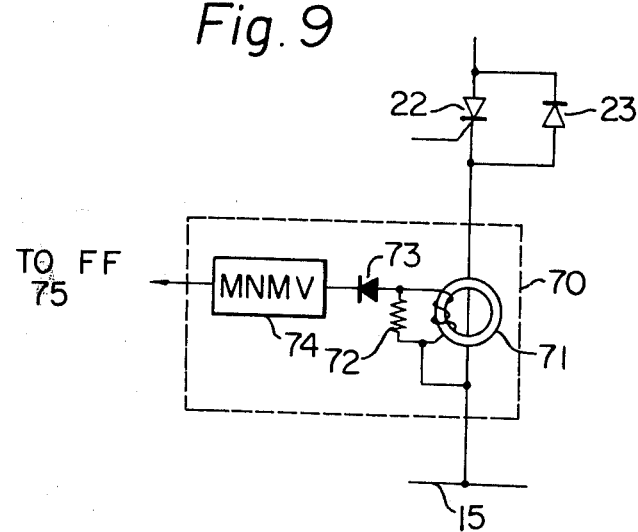
FIG. 9 is an example of the detecting circuit used in the circuit of FIG. 9.

In FIG. 8 a variation of the gate control circuit 60 is illustrated. A detector circuit 70 detects the cessation of forward commutating current by detecting the presence of backward commutating current $I_d$ which flows through the feedback diode 23 in the negative half cycle of the commutation current. An example of the detector circuit 70 is shown in FIG. 9 in which detector 70 comprises a current transformer 71 having a ring shaped core through which the forward and backward commutating current is allowed to pass. To pick up that signal which is developed across resistor 72 as the result of the flow of backward commutating current, a diode 73 is coupled to the resistor 72. A monostable multivibrator 74 is coupled to the diode 73 to reshape the sinusoidal signal from diode 73 into a square wave signal which is used to turn on flip-flop 75. This activates switching gate 67 and applies the negative potential 68 to the rectifier's gate. The flip-flop 75 remains in the turn-on state until a subsequent gating pulse from the gating pulse oscillator 65 is reapplied to the SCR 22. Therefore, the negative bias is applied during the time ranging from the cessation of the forward commutating current to the time of reapplication of a gating pulse to the SCR 22.

Figure 10:
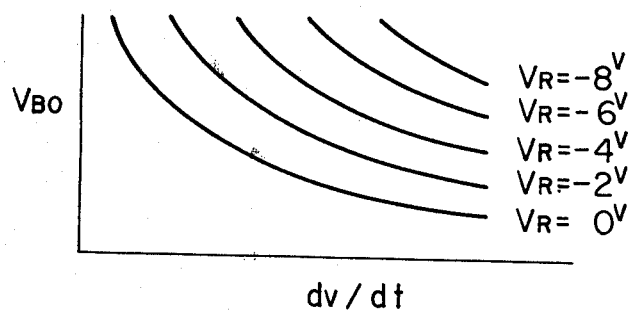
FIG. 10 is a graph showing relationships between breakover voltage, dv/dt value and negative bias potential.

By the application of a negative bias to the control gate of the silicon-controlled rectifier with respect to its cathode during the specified interval, the excess carriers in the vicinity of the center junction are spread out to the end junctions so that the device rapidly assumes a blocking state after forward conduction. The dv/dt value of the device increases as the negative bias ($V_R$) increases for a given value of breakover voltage ($V_{BO}$) as shown in FIG. 10. Also, the breakover voltage increases with the negative bias potential for a given dv/dt value.

What is claimed is:

1. The method of providing a high dv/dt capability of a silicon-controlled rectifier of a static power converter, wherein the dv/dt is the rate of rise of forward voltage applied to the anode of said silicon-controlled rectifier and wherein the control gate thereof is supplied with positive gating pulses at an ultrasonic frequency to generate a forward commutating current which drives an induction heating coil of an inverter at said ultrasonic frequency, comprising, detecting the cessation of said forward commutating current, setting a flip-flop device to an ON state upon the detection of the cessation of said forward commutating current, resetting said flip-flop device to the OFF state by said positive gating pulses, and applying a negative potential to the control gate of the silicon-controlled rectifier with respect to the cathode during the ON state of said flip-flop device.

2. An induction heating apparatus including a full wave rectifier to receive a alternating current voltage for generating a full-wave rectified unidirectional voltage, a power converter including a silicon-controlled rectifier adapted to be supplied with said unidirectional voltage, a feedback diode coupled in inverse parallel relation therewith, a commutating LC network including an induction heating coil coupled across said silicon-controlled rectifier, and a gate control circuit for repetitiously gating said silicon-controlled rectifier at ultrasonic frequency, said gate control circuit comprising means for generating positive gating pulses at ultrasonic frequency to initiate a forward commutating current flow through said silicon-controlled rectifier in one half cycle of said ultrasonic frequency and a backward commutating current flow through said feedback diode in the other half cycle, means for detecting said reverse commutating current flow, a bistable device having a first binary state in response to the detection of said reverse commutating current flow and a second binary state in response to said gating pulse, and a switching gate responsive to the first binary state of the bistable device to apply a negative potential from a DC voltage source to the control gate of said silicon-controlled rectifier with respect to the cathode thereof.

3. An induction heating apparatus as claimed in claim 2, wherein said gate control circuit comprises means (70) for detecting the cessation of said forward commutating current thereupon, a flip-flop (75) responsive to the direction of said forward commutating current, a switching gate (67) responsive to said flip-flop to apply said negative potential to the control gate of said silicon-controlled rectifier with respect to the cathode thereof, said flip-flop being responsive to said pulse generating means (65) to restore the original state.

4. An induction heating apparatus comprising, a full wave rectifier to receive an alternating current voltage for generating a full-wave rectified unidirectional unfiltered voltage, a static power converter including a silicon-controlled rectifier supplied in operation with said unidirectional voltage, a feedback diode coupled in inverse parallel relation therewith, a commutating LC network including an induction heating coil coupled across main terminals of said silicon-controlled rectifier, means for generating first pulses at an ultrasonic frequency, means for generating second pulses in response to the leading edge of the first pulses and having a duration smaller than the duration of said first pulses, means for applying the second pulses to the control gate of the silicon-controlled rectifier to turn it on and off at said ultrasonic frequency to generate a forward commutating current through the main terminals of the silicon-controlled rectifier in the first half cycle of the ultrasonic frequency and a backward commutating current through the feedback diode in the second half cycle of the ultrasonic frequency, means for inverting the polarity of the first pulses, a switching gate responsive to said inverted pulses for coupling a negative potential from a DC voltage source to the control gate of said silicon-controlled rectifier with respect to the cathode thereof, and said first pulses having a duration equal to the duration of said forward commutating current.

* * * * *